United States Patent
Hassan et al.

(10) Patent No.: US 10,466,570 B2
(45) Date of Patent: Nov. 5, 2019

(54) OPTICAL PHASED ARRAY WITH SIMPLIFIED ADDRESSING

(71) Applicant: COMMISSARIAT A L'ENERGIE ATOMIQUE ET AUX ENERGIES ALTERNATIVES, Paris (FR)

(72) Inventors: Karim Hassan, Moneteau (FR); Salim Boutami, Grenoble (FR); Christophe Kopp, Fontanil Cornillon (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 0 days.

(21) Appl. No.: 16/110,757

(22) Filed: Aug. 23, 2018

(65) Prior Publication Data
US 2019/0064632 A1 Feb. 28, 2019

(30) Foreign Application Priority Data
Aug. 31, 2017 (FR) .................................... 17 58017

(51) Int. Cl.
*G02F 1/295* (2006.01)
(52) U.S. Cl.
CPC ................. *G02F 1/2955* (2013.01)
(58) Field of Classification Search
CPC .................................................... G02F 1/2955
See application file for complete search history.

(56) References Cited

U.S. PATENT DOCUMENTS

| 9,476,981 B2 * | 10/2016 | Yaacobi .................. G01S 17/36 |
| 2016/0124145 A1 | 5/2016 | Hassan et al. |
| 2017/0016990 A1 * | 1/2017 | Yaacobi .................. G01S 17/36 |
| 2017/0097301 A1 | 4/2017 | Lefebvre et al. |
| 2018/0039024 A1 | 2/2018 | Boutami et al. |
| 2018/0204974 A1 | 7/2018 | Boutami et al. |

OTHER PUBLICATIONS

U.S. Appl. No. 15/978,481, filed May 14, 2018, Unknown.
U.S. Appl. No. 16/030,887, filed Jul. 10, 2018, Salim Boutsmi, et al.
U.S. Appl. No. 16/026,535, filed Jul. 3, 2018, Boris Taurel, et al.

(Continued)

*Primary Examiner* — Thomas A Hollweg
*Assistant Examiner* — Mary A El-Shammaa
(74) *Attorney, Agent, or Firm* — Oblon, McClelland, Maier & Neustadt, L.L.P.

(57) ABSTRACT

A device for emission of an electromagnetic wave front designed to be connected in use to a light source emitting a light beam, and including at least three emission waveguides, each including a straight segment that receives one or several optical power extraction elements; and on the input side of each of the straight segments, a phase shift element and an optical coupler with an adjustable coupling ratio. At least two straight segments extend along straight lines that are not parallel to each other. An orientation of a principal emission beam is selected, defined in far field, by adjusting the coupling ratio of each of the optical couplers and the phase shift introduced by phase shift elements receiving the optical power. The invention is particularly advantageous in the context of remote detection.

15 Claims, 4 Drawing Sheets

(56) References Cited

OTHER PUBLICATIONS

French Preliminary Search Report dated May 22, 2018 in French Application 17 58017, filed on Aug. 31, 2017 (with English Translation of Categories of cited documents).

Hutchison, D., et al. "High-resolution aliasing-free optical beam steering", Optica, vol. 3, No. 8, 2016, 4 pages.

Komljenovic, T., et al. "Sparse aperiodic arrays for optical beam forming and LIDAR", Optics Express, vol. 25, No. 3, 2017, 18 pages.

Kwong, D., et al. "Integrated Optical Phased Array Based Large Angle Beam Steering System Fabricated on Silicon-on-Insulator", Silicon Photonics VI, SPIE, vol. 7943, No. 1, 2011, 6 pages.

Yaacobi, A., et al. "Integrated phased array for wide-angle beam steering", Optics Letters, Optical Society of America, vol. 39, No. 15, 2014, 4 pages.

Gabrielli, L., et al. "Aperiodic Antenna Array for Secondary Lobe Suppression", IEEE Photonics Technology Letters, IEEE Service Center, vol. 28, No. 2, 2016, 4 pages.

Sun, J., et al. "Large-scale nanophotonic phased array", Nature, vol. 493, 2013, 5 pages.

\* cited by examiner

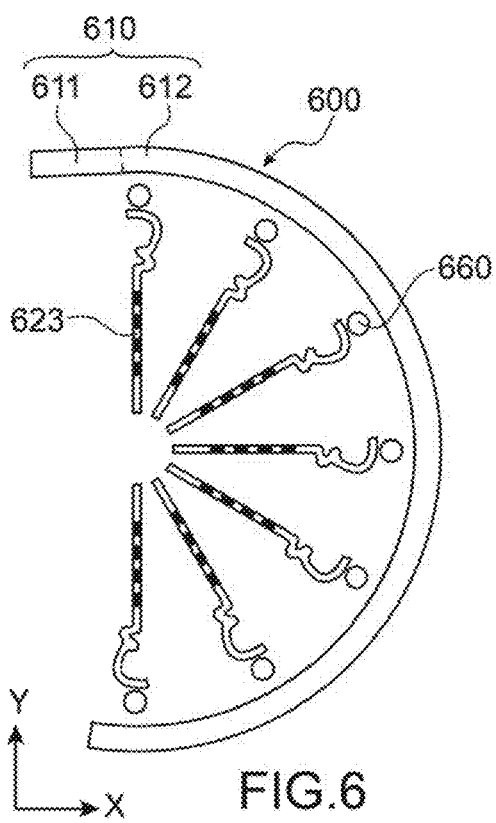
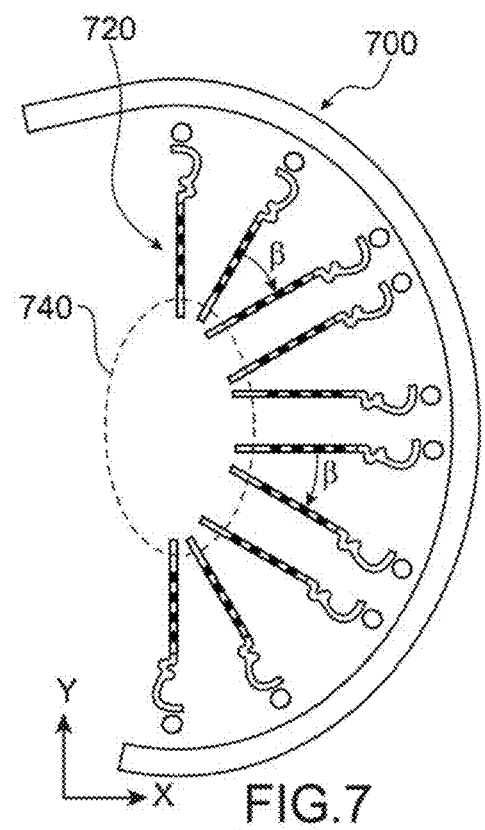
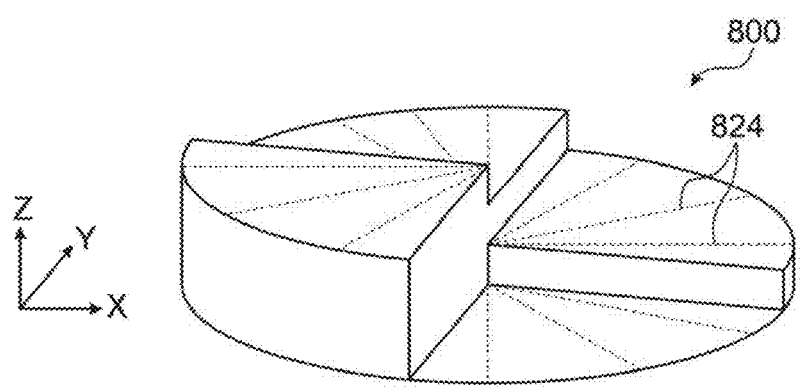

OPTICAL PHASED ARRAY WITH SIMPLIFIED ADDRESSING

TECHNICAL DOMAIN

The invention relates to an electromagnetic wave front emission device comprising a plurality of elementary light sources, and phase shift elements to control relative optical phase shifts of the light beams emitted by said elementary sources.

The elementary sources together form a predetermined distribution of the electromagnetic field in far field, by constructive and destructive interference phenomena. In particular, they can constitute a global source emitting a main emission beam, defined in far field, the orientation of which in space can be controlled by means of said phase shift elements.

Such an emission device is routinely known as an "optical phased array".

STATE OF PRIOR ART

The document «*High-resolution allasing-free optical beam steering*», David N. Hutchison & al., Optica, Vol. 3, No. 8, August 2016, pages 887-890, describes an electromagnetic wave front emission device, said device comprising a tunable laser the optical power of which is distributed on a plurality of emission waveguides.

Each emission waveguide has an upstream portion comprising a phase shift element and a straight downstream portion comprising an optical power extraction network. Therefore the extraction networks of the different emission waveguides form elementary sources, for which relative optical phase shifts can be controlled.

Straight portions of the different emission waveguides are aligned side-by-side, parallel to each other.

In far field, the optical power emitted by this device is concentrated towards a preferred direction, the orientation of which is defined by two angles $\psi$ and $\theta$.

Throughout this text, the preferred direction of concentration of the optical power in far field is called the "principal emission direction".

The angle $\psi$ is controlled by means of the phase shift elements.

The angle $\theta$ is controlled by varying the wavelength of the signal output by the tunable laser. The wavelength range that can be scanned by the tunable laser extends from 1260 nm to 1360 nm. This corresponds to a scanning amplitude of the angle $\theta$ equal to only 17°.

In the paper "*Large-scale nonophotonic phased array*", Nature, Vol. 493, Jan. 10, 2013, pages 195 to 199, the authors, Jie Sun & al., describe a solution overcoming this limitation on the angle $\theta$.

In particular, they describe an emission device comprising a laser source, the optical power of which is distributed on a matrix of 64×64 silicon nano-antennas, distributed in rows and columns according to a square grid.

Each nano-antenna forms an elementary source, and comprises a heating portion forming a phase shift element.

In far field, the optical power emitted by this device can be concentrated towards a principal emission direction, the orientation of which is defined by two angles. The value adopted by each of these two angles is controlled in the same way, using phase shift elements.

Thus, the limitation described above related to a scanning amplitude is overcome.

On the other hand, the measurements made in the paper show that there is a beam replication phenomenon resulting in the presence of secondary beams with a smaller intensity around a main beam oriented along the principal emission direction.

These secondary beams are not desirable in most cases, and particularly in applications to remote detection.

Therefore one purpose of this invention is to disclose a device for emission of an electromagnetic wave front, of the optical phased array type, capable of providing:
 a wide scanning range in space of a principal emission direction; and also
 an emission without a beam replication phenomenon.

PRESENTATION OF THE INVENTION

This objective is achieved with a device for emission of an electromagnetic wave front designed to be connected in use to a light source emitting a light beam, and comprising:
 at least three emission waveguides, each comprising a straight segment that comprises one or several optical power extraction element(s), called extraction element(s); and
 upstream from each of said straight segments, a corresponding phase shift element; and
 upstream from each of said phase shift elements, a corresponding optical coupler, each optical coupler having an adjustable coupling ratio;
at least two of said straight segments extending along straight lines that are not parallel to each other.

Said straight lines can intersect when the corresponding emission waveguides extend in the same plane.

Throughout this text, the term "upstream" refers to the direction of propagation of light emitted by said light source in the emission device according to the invention.

Therefore each optical coupler and each phase shift element are located on the side of the input end of one of the straight segments.

Each optical power extraction element forms an elementary source adapted to emit a light beam, the phase of which is adjustable using the phase shift element located on the side of the input of the corresponding straight segment. In this case the phase adjustment corresponds to adjustment of a phase shift relative to an original optical phase. The original optical phase is the phase of the light beam emitted by the light source that, during use, is connected to the emission device according to the invention. After the phase shift, the optical phase is the optical phase of the beam emerging from the phase shift element, in the associated straight segment, and arriving on the first optical power extraction element along said segment.

Each elementary source emits a light beam only when a light signal enters the corresponding straight segment.

The optical couplers, each presenting an adjustable coupling ratio, can be used to select at least two straight segments to which a light signal will be input.

The straight segments thus selected together define the orientation of an extraction plane.

The extraction plane is a plane containing all the principal emission directions accessible using the selected straight segments.

It is approximately orthogonal to the average direction of these straight segments.

The orientation of the principal emission direction in the extraction plane then depends on the relative phase shifts of the light beams emitted by the elementary sources associated with the selected straight segments.

According to the invention, the emission device comprises at least three emission waveguides each with a straight segment, and at least two of said straight segments extend along lines that are not parallel to each other.

Therefore, at least two pairs of straight segments can be selected, together defining two different orientations of the extraction plane.

Therefore the invention provides an innovative solution for controlling the principal emission direction of an optical phased array, based on one-dimensional addressing of a series of straight waveguide segments and on an innovative layout of these straight segments.

The parameters used to define the orientation in space of the principal emission direction are optical phase shifts, and orientations of straight waveguide segments.

A large number of different orientations of the principal emission direction can thus be accessed, these orientations being distributed in a plurality of planes in the three-dimensional space. In particular, these orientations can be distributed on a plurality of planes inclined relative to each other, and distributed on an angular range with a width much larger than 17°, for example more than 90° and possibly for example up to 180°.

Furthermore, addressing in a single dimension with phase shift elements upstream from the straight segments allows bringing the extraction elements closer to each other.

This characteristic can limit and even eliminate beam replication phenomena.

This effect is particularly advantageous in the context of using the device according to the invention, as the emitter of a light detection and ranging device (LIDAR), and more particularly for remote detection of the presence of an object, and to measure its position. In such use, the device according to the invention is used for three-dimensional scanning of a pulsed light beam, and a detection set receives a return signal originating from reflection of this beam on a target object.

The beam replication corresponds to the presence of secondary beams around a principal beam. These secondary beams can be reflected by objects other than the target object and thus distort or at least increase the complexity of the digital reconstruction of a scene in three dimensions. Furthermore, these secondary beams receive some of the total optical power emitted by the emission device, correspondingly reducing the optical power of the main beam and consequently a maximum detection distance of an object.

Therefore it is particularly advantageous to limit beam replication phenomena when the emission device according to the invention is used for remote detection.

Addressing in a single dimension with phase shift elements on the side of the input of the straight segments also provides a means of using materials other than silicon to make the emission waveguides with their phase shift elements, without causing the appearance of or the increasing of beam replication phenomena. The following contains details of the particularly advantageous application of silicon nitride.

According to the invention, an optical coupler with an adjustable coupling ratio can simply designate a coupler capable of coupling or not coupling light. Such an optical coupler then forms a simple optical switch.

The invention also relates to a method of using an emission device according to the invention, in which each optical coupler comprises a coupling ring and each phase shift element comprises a segment of an emission waveguide called the phase shift segment, the method comprising:

a step to adjust the respective coupling ratio of each of the optical couplers, by adjusting the intensity of an electric voltage or current supplying heating by the Joule effect to the corresponding coupling ring; and a step to adjust a corresponding phase shift introduced by each of the phase shift elements associated with the optical couplers, of which the coupling ratio exceeds a predetermined threshold, by adjustment of the intensity of an electric voltage or current supplying heating by the Joule effect, to the corresponding phase shift segment.

BRIEF DESCRIPTION OF THE DRAWINGS

This invention will be better understood after reading the description of example embodiments given purely for information and that are in no way limitative, with reference to the appended drawings on which:

FIG. 6 diagrammatically illustrates a top view of a second embodiment of an emission device according to the invention;

FIG. 7 diagrammatically illustrates a top view of a third embodiment of an emission device according to the invention; and FIG. 8 very diagrammatically illustrates a perspective view of a fourth embodiment of an emission device according to the invention;

DETAILED PRESENTATION OF PARTICULAR EMBODIMENTS

The first step is an analysis of the optical power distribution in far field, in an emission device.

Figure 1A:
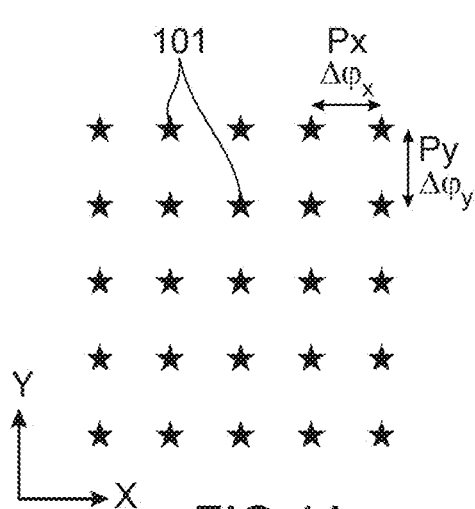
FIGS. 1A and 1B illustrate a distribution of elementary sources in an emission device according to prior art, and a distribution of the optical power obtained in far field using such a device, respectively.

FIG. 1A diagrammatically represents the distribution of elementary sources 101 of an emission device as presented in the introduction, comprising an array of elementary source 101 distributed in rows and columns.

The elementary sources 101 are distributed along the (OX) and (OY) axes, with distribution pitches $P_X$, $P_Y$ respectively. The relative phase shift between two neighbouring elementary sources aligned along (OX), is equal to $\Delta\varphi_x$. The relative phase shift between two neighbouring elementary sources aligned along (OY), is equal to $\Delta\varphi_y$. The (OY) and (OX) axes belong to an orthonormal coordinate system (OXYZ).

Figure 1B:
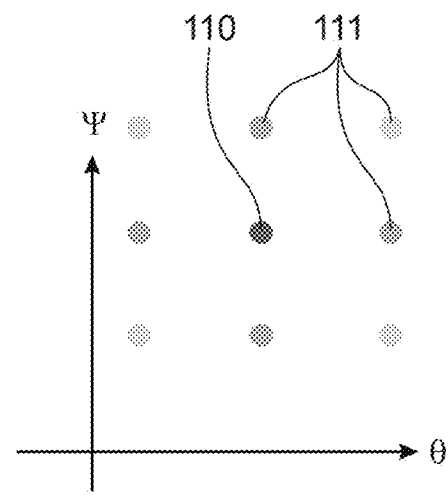

FIG. 1B shows a diagrammatic view of a distribution of the far field optical power obtained using such a device. The power is distributed in this case on a principal beam 110, and on a plurality of secondary beams 111. The orientation of these beams is defined by two angles θ and ψ. The angles θ and ψ correspond to a deviation angle in the (OXZ) plane and in the (OYZ) plane respectively.

In considering this optical power distribution, the inventors have realised that the orientations that can receive optical power are defined by angles $(\theta_m; \psi_n)$ such that:

$$\sin(\theta_m) = \frac{\Delta\varphi_x + m*2\pi}{k_0 * P_X} \quad (1)$$

$$\sin(\psi_n) = \frac{\Delta\varphi_y + n*2\pi}{k_0 * P_Y} \quad (2)$$

where $k_0 = \frac{2\pi}{\lambda}$, $\lambda$ is the wavelength emitted by the elementary sources, and m and n are relative integers.

Furthermore, the possible orientations are those associated with values of m and n such that:

$$\sin^2(\theta_m) + \sin^2(\psi_n) \le 1 \quad (3)$$

Consequently, the number of orientations that can receive optical power reduces when the values of $P_X$ and $P_Y$ reduce. Furthermore, these orientations separate from each other when the values of $P_X$ and $P_Y$ reduce.

In other words, the distribution pitch of elementary sources determines whether or not beam replication phenomena exist.

The inventors have thus demonstrated that a means of avoiding or limiting beam replication consists of bringing the elementary sources closer to each other.

For each wavelength $\lambda_p = 1.55$ μm, the distribution pitch of elementary sources must be less than or equal to 1.55 μm to avoid beam replication, which is not possible because of the size of the phase shift elements on each nano-antenna. Even a pitch of 3 μm, enabling a good reduction in the number of replications, cannot be achieved due to the size of phase shift elements on each nano-antenna.

The solution proposed by the inventors is illustrated in the following.

Figure 2:
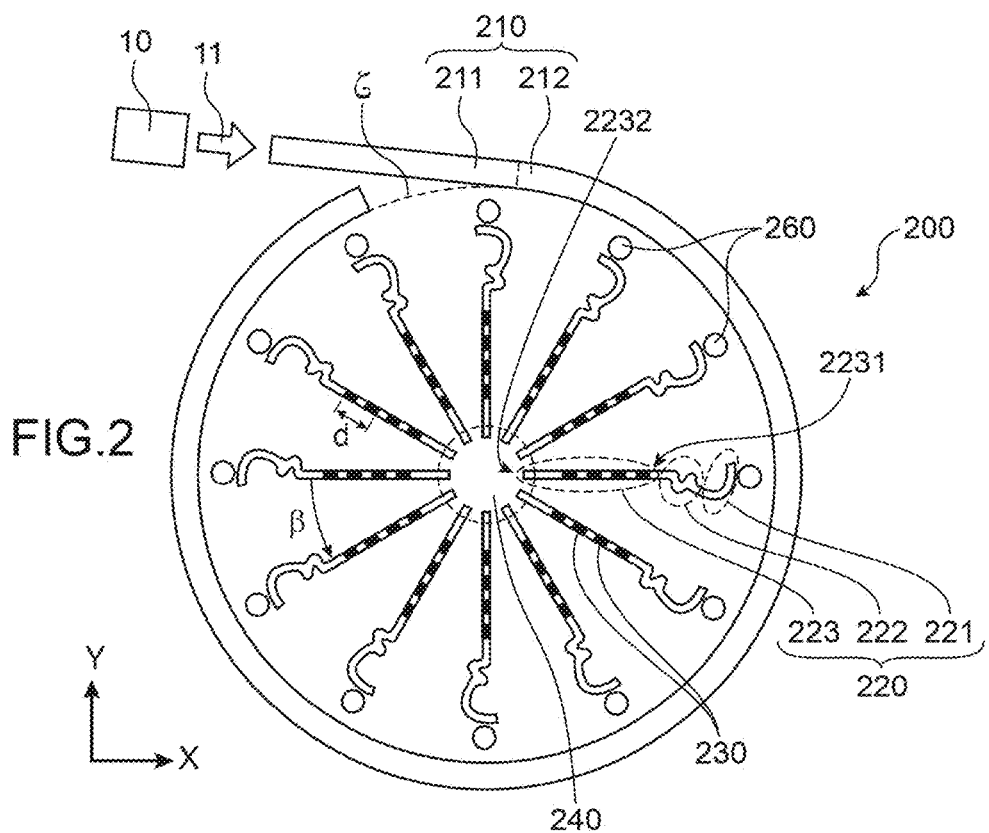
FIG. 2 diagrammatically illustrates a top view of a first embodiment of a wavefront emission device according to the invention.

FIG. 2 illustrates a first embodiment of a device 200 according to the invention.

The device 200 in this case comprises:
- an injection waveguide 210, receiving in input a light beam 11 supplied by a light source 10;
- a plurality of emission waveguides 220 in this case arranged in a star formation; and
- a plurality of optical couplers 260 distributed along the injection waveguide 210, each at the input to an emission waveguide 220.

The light source 10 is a monochromatic source, particularly a laser source, emitting a light beam centred on a wavelength $\lambda_p$. It is placed at the input to the injection waveguide 210 at a first end of the waveguide. It sends the light beam 11 in the injection waveguide 210.

The light source 10 is not an integral part of the device 200 according to the invention.

The injection waveguide 210 is configured to receive and optically guide light at wavelengths of about $\lambda_p$.

The injection waveguide 210 in this case is composed of silicon.

It has an input region 211 on the side of the light source 10, and an injection region 212 that in this case extends along almost all of a circle $\mathcal{C}$, in the form of an open ring.

The emission waveguides 220 and the optical couplers 260 extend inside this circle $\mathcal{C}$.

Each optical coupler 260 is located along the injection waveguide 210 between a lateral surface of the injection waveguide 210 and the inlet end of an emission waveguide 220.

Each optical coupler 260 has an adjustable coupling ratio at wavelength $\lambda_p$.

Each optical coupler 260 in this case is composed of a heating coupling ring, in other words a waveguide folded on itself in the form of a ring, and electrically connected to a current or voltage source (not shown). The ring is heated more or less depending on the intensity of the current or the voltage, which modifies its optical index and therefore the constructive phase condition in the ring. The coupling wavelength of the ring is thus modified, to move it towards or away from the wavelength $\lambda_p$. Thus, the more or less intense heating of the ring changes its capacity to optically couple the injection waveguide 210 and an emission waveguide 220, at the wavelength $\lambda_p$. Coupling is of the evanescent type, usually without any direct physical contact between the ring and the injection waveguide, respectively between the ring and the associated emission waveguide.

In this case, the optical couplers 260 are made of silicon.

An optical coupler with an adjustable coupling ratio is known according to prior art, and therefore will not be described herein in more detail.

As a variant, each optical coupler 260 with an adjustable coupling ratio comprises a ring optical coupler and an attached heating element, located in contact with the optical coupler and electrically connected to a current or voltage source.

It is said that the optical coupler 260 is passing when it is adapted to transfer part of the light beam at wavelength $\lambda_p$ transiting in the injection waveguide 210, to the closest emission waveguide.

It is said that the optical coupler is blocking when it does not allow this transfer.

A first threshold can be defined, an optical coupler for which the coupling ratio at wavelength $\lambda_p$ is larger than this first threshold being said to be passing.

A second threshold can be defined, an optical coupler for which the coupling ratio at wavelength $\lambda_p$ is less than this second threshold being said to be blocking. The first and second thresholds can be equal.

Each optical coupler 260 is located at the inlet to a respective emission waveguide, that receives or does not receive light depending on whether the optical coupler is passing or blocking. It can be considered that the injection waveguide 210 and the optical couplers 260 together form a multiplexer with selection of channels.

Each emission waveguide 220 is configured to receive and optically guide light at wavelengths of about $\lambda_p$.

Each emission waveguide 220 in this case is composed of silicon.

Preferably, the injection waveguide 220, the optical couplers 260, and the emission waveguides 220 all have the same chemical composition, except possibly for the concentration of doping ions.

The emission waveguides 220 in this case extend with the optical couplers 260 and the injection waveguide 220, in the same plane (OXY) of an orthornormal coordinate system (OXYZ).

In particular, the emission waveguides 220 have coplanar lower faces parallel to the plane (OXY).

In this case, each emission waveguide 220 comprises three segments:

a coupling segment 221, located upstream from the emission waveguide 220 (relative to the direction of propagation of light emitted by the light source, in said waveguide 10);

a phase shift segment 222, downstream from segment 221; and a straight segment 223, downstream from phase shift segment 222.

At least part of the coupling segment 221 extends parallel to a tangent to the corresponding coupling ring 260. The coupling segment 221 forms an inlet region for the emission waveguide 220 adapted to receive a signal at wavelength $\lambda_p$ originating from the injection waveguide 210 when the corresponding optical coupler 260 is passing.

In this case the phase shift segment 222 is in the form of a coil.

It is electrically connected to a current or voltage source, not shown. The segment 222 is heated more or less depending on the intensity of the current or the voltage, which modifies its optical index. The variable modification of this optical index causes a variable shift of the optical phase of a light signal propagating in said segment 222, by the thermo-optic effect.

According to one variant not shown, the phase shift segment is heated through an attached heating element. The attached heating element is placed in contact with said phase shift segment. The attached heating element may for example be a metal strip electrically connected to a current or voltage source.

As a variant, the phase shift segment 222 is made from a doped material and the adjustment of the phase shift that it provides is made by injection of desertion of carriers.

The segment 222 thus forms a phase shift element placed on the side of the output of an optical coupler 260 and on the side of the input of a straight segment 223 according to the invention, to provide a required phase shift to a light signal output from the injection waveguide before it reaches said straight segment 223.

Such a phase shift element is known according to prior art, and therefore will not be described herein in more detail.

In this case, the straight segments 223 each extend along a radius of the circle $C$ mentioned above.

They are uniformly distributed according to an angular pitch $\beta$. For readability reasons, an example is illustrated in which this pitch $\beta$ is equal to 30°. In practice, this pitch $\beta$ is preferably less than or equal to 10°, or even less than or equal to 5°.

In this case, the straight segments 223 are distributed over an angular range of 360°.

Each of the straight segments 223 has an input end 2231 and an output end 2232, on the side opposite the input end 2231.

All the input ends 2231 of the different emission waveguides are located on the same side as the injection waveguide 210.

All the output ends 2232 of the different emission waveguides are located in a zone 240 called the core zone.

The distance between two emission waveguides is minimal at the output ends 2232. However, the centre-to-centre distance between two neighbouring waveguides is more than $\lambda_p/2$, to prevent optical coupling being these waveguides.

Each straight segment 223 receives a plurality of optical power extraction segments called extraction elements 230, illustrated by respective black squares.

Each of the extraction elements 230 can extract at least part of an incident light signal circulating in said segment, to the same half-space delimited by the straight segments, in this case an upper half-space located above the straight segments.

The different extraction elements on the same straight segment are distributed along the longitudinal axis of said segment. Their extraction ratios are adapted so that each can emit part of a light signal input into said segment.

Each extraction element 230 is composed of a diffracting or diffusing structure. Each structure may be a surface structure, in this case extending only in an upper region of one of the straight segments 223. As a variant, said structure can pass through. In any case, reflection means such as a mirror or a dioptre can extend in front of said structure, in this case on the side of a bottom face of the straight segment, to extract light to the upper half-space above the plane of the straight segments.

For example, each extraction element 230 may be a surface extraction element, or even a simple through or non-through hole.

When the extraction elements 230 are extraction networks, the different networks in the same straight segment 223 have the same orientation and the same period.

The angular shift between the orientation of the extraction networks and the orientation of the corresponding straight segment 223 may be constant. In this case, in the embodiment shown in FIG. 2, the networks of two different straight segments 223 have different orientations.

In any case, regardless of whether or not they are extraction networks, the phase of the extraction elements 230 in the same straight segment 223 are advantageously shifted by $2k\pi$, k being an integer. This phase shift of $2k\pi$ is made possible by spacing the extraction elements 230 along the straight segment 223 by a distance d that is a multiple of $$k * \frac{\lambda}{N_{eff}},$$

where $N_{eff}$ is the effective index of the guided mode in the straight segment 223. In other words, the extraction elements of a particular straight segment 223 are preferably spaced in pairs by a distance d such that:

$$d = j * \frac{\lambda_p}{N_{eff}} \qquad (4)$$

where j is a positive integer and $N_{eff}$ is the effective index of the guided mode in the straight segment 223.

The distance d is a centre-to-centre distance.

Preferably, this distance d is constant along the length of a particular straight segment 223. In other words, on each straight segment 223, the extraction elements 230 are distributed at a regular pitch p.

The pitch p is advantageously the same on all straight segments 223.

In this case, the extraction elements 230 of the different straight segments 223 are distributed along a series of concentric circles. Each of these circles receives a single extraction element from each of the straight segments 223.

Preferably, the centre-to-centre distance between two extraction elements 230 belonging to two neighbouring emission waveguides remains less than a few $\lambda_p$, for example less than $5*\lambda_p$.

In practice, the injection waveguide 210, the optical couplers 260 and the emission waveguides 220 are advantageously embedded in silicon oxide (silica), that acts as a cladding for the emission waveguides 220.

An orientation of a principal emission beam is selected, defined in far field, by adjusting the coupling ratio of each of the optical couplers, and the phase shift introduced by phase shift elements receiving the optical power.

Figure 3A:
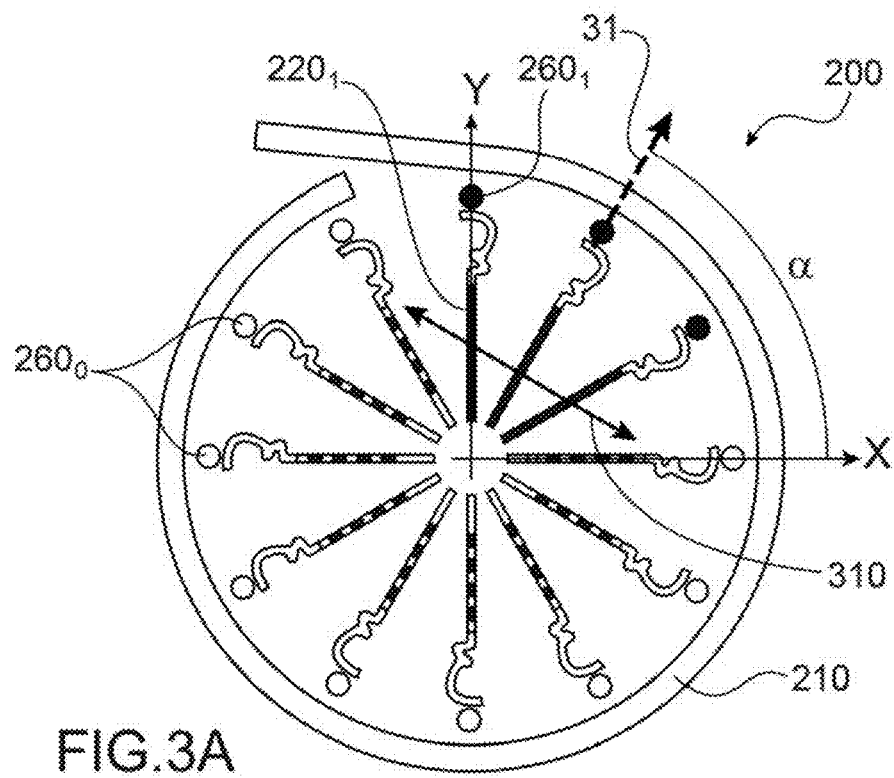
FIGS. 3A and 3B diagrammatically illustrate the emission device in FIG. 2 with an associated principal emission direction, in a top view and in a perspective view respectively.
Figure 3B:
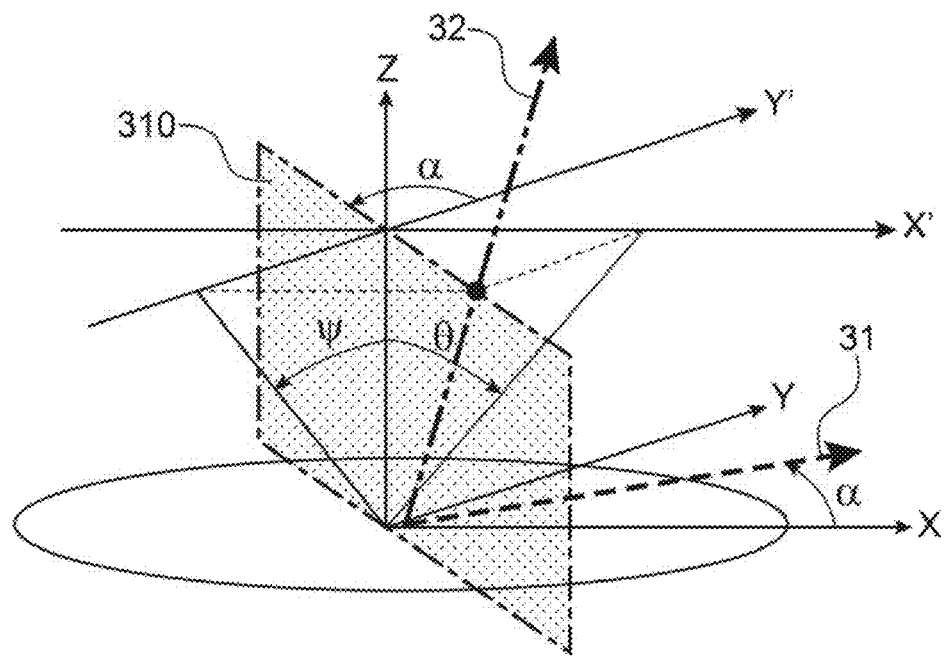

Details of the operation of the emission device 200 are illustrated in detail on FIGS. 3A and 3B.

On FIG. 3A, the emission device is shown in a top view.

On FIG. 3B, it is show diagrammatically in a perspective view.

In FIG. 3B, the orthonormal coordinate system (OXYZ) is centred on the centre of the circle C mentioned above. FIG. 3B also shows a coordinate system (OX'Y') that is a projection along (OZ), in far field, of the coordinate system (OXY).

According to the invention, not all optical sensors have the same coupling ratio at all times.

At each instant, passing optical couplers are optical couplers that stand in direct neighbouring to each other (or two opposed groups of neighbouring optical couplers associated with the same average direction due to symmetry of the emission device, see below).

In FIG. 3A, optical couplers $260_1$ in the passing state are represented by a black disk, and optical couplers $260_0$ in the blocking state are represented by a simple circle.

In this case, only three optical couplers are passing, the others being blocking.

The three passing optical couplers $260_1$ are associated with three corresponding emission waveguides $220_1$, said to be active, each represented by a thick solid line. Light passing in the injection waveguide 210 is coupled to these three active waveguides $220_1$. The other emission waveguides $220_0$ do not receive light.

The adjustment of the coupling ratios of the optical couplers can be binary. The coupling ratio can then only be one of two values, either a low value corresponding to a blocking coupler, or a high value corresponding to a passing coupler.

As a variant, the adjustment of the coupling ratios allows a fine adjustment, for example to refine the width of the principal emission beam, in far field, emitted by the emission device according to the invention.

It would also be possible to provide precise adjustment of coupling ratios, so as to couple the same quantity of light in each of the active waveguides $220_1$. To achieve this, the coupling ratio associated with each of the passing optical couplers $260_1$ increases with increasing distance from the inlet region 211 of the injection waveguide.

During operation, light propagates in the injection waveguide and is then injected into the activated waveguides $220_1$, through the passing optical couplers $260_1$.

In each activated waveguide, light passes through the phase shift segment in which its optical phase is shifted by a predetermined value (this value possibly being zero).

Light then successively passes to each of the extraction elements of the straight segment. Each extraction element extracts a part of the optical power outside the emission waveguide, and thus forms an elementary light source.

According to one advantageous variant, the values of the optical power extraction ratio for extraction elements of one straight segment are different from each other, and this value increases with increasing distance from the input to said segment. Thus, the loss of optical power at the input to an extraction element due to extraction in the upstream extraction element(s) is compensated by a higher extraction ratio. It is thus possible to equalise optical powers extracted by each of the extraction elements of the same straight segment.

To obtain these increasing extraction ratios, the width of the extraction elements can increase with increasing distance from the input to the straight segment (increasing wide holes, or increasingly long extraction networks). In addition or as a variant, the extraction elements can have an etching depth that increases with increasing distance from the segment input.

The average direction 31, associated with the straight segments of the activated waveguides $220_1$ is defined by an angle α. This angle is defined relative to the (OX) axis of the (OXYZ) orthornormal coordinate system.

This average direction defines an extraction plane 310, orthogonal to said average direction 31, at wavelength $\lambda_p$.

The extraction plane 310 is a vertical plane, parallel to the (OZ) axis, inclined by an angle α relative to the (OYZ) plane.

The extraction plane 310 is the plane receiving all the principal emission directions, accessible using three activated waveguides $220_1$.

The principal emission directions are defined in far field, in other words at a distance from the emission device larger than the characteristic size of said device, and even in practice, at a distance from the emission device of more than a few centimeters, for example more than 5 cm.

The principal emission direction is represented on FIG. 3B by an arrow 32. It is defined only in far field and it extends in the extraction plane 310. Its orientation depends on phase shifts between light signals emitted by extraction elements of the activated waveguides $220_1$. This orientation is defined in three-dimensional space by two angles θ and ψ. The angles θ and ψ correspond to a deviation angle in the (OXZ) plane and in the (OYZ) plane respectively.

Therefore by controlling the passing or blocking state of the optical couplers 260, an average orientation of the activated straight segments, and therefore a required orientation of the extraction plane, can be selected.

FIG. 3A in particular shows that the offset of the three activated waveguides $220_1$ results in a rotation of the extraction plane around the (OZ) axis.

The coupling ratio of an optical coupler is advantageously controlled by controlling an intensity value of the current or the voltage of an electrical signal providing heating to this optical coupler by the Joule effect.

Then, by controlling the phase shift provided by each phase shift element 250 associated with the activated waveguides $220_1$, it is possible to select a required orientation of the principal emission direction in the extraction plane.

The phase shift is advantageously controlled by controlling a value of the intensity of the current or the voltage of an electrical signal providing heating to a phase shift element according to the invention by the Joule effect.

Therefore elements to define a predetermined orientation of the principal emission direction are moved away from a region receiving elementary sources (in this case the extraction elements).

These elements are also located in a region in which they are at a distance from each other, due to the radial layout of the straight segments into which the elementary sources fit.

It is thus possible to reconcile a large size of the phase shift elements and a very small distance between two neighbouring elementary sources.

Waveguides made of silicon nitride ($Si_3N_4$) support much higher optical powers than are possible with silicon waveguides. In particular, they can transport high optical power beams without inducing the appearance of non-linear effects that could deform these beams.

On the other hand, since silicon nitride is not very sensitive to temperature variations, phase shift segments made of silicon nitride must be longer than segments made of silicon.

By moving these phase shift elements away from an emission zone containing the elementary sources, the invention makes it possible to make emission waveguides from silicon nitride ($Si_3N_4$), rather than silicon, without this causing an increase in the distance between two neighbouring elementary sources.

A short distance between two neighbouring elementary sources can prevent beam replication phenomena.

It is thus possible to increase the optical power circulating in the emission device according to the invention, and therefore an optical power re-emitted by the emission device, without causing the appearance of beam replication phenomena. In other words, an optical phased array is proposed that can output more useful power than was possible in prior art, without deteriorating the beam quality.

These high optical powers are particularly advantageous in the context of use of the device according to the invention as an emitter of a laser remote detection device. The increase in the optical power emitted by the device according to the invention then results in an increase in the maximum detection distance. Due to this invention, this increase in the detection distance is not accompanied by the appearance of beam replication phenomena that could disturb detection. The angle between any beam replications and the principal beam is sufficiently large so that the replications do not degrade detection.

The use of silicon nitride emission waveguides in particular makes it possible to detect objects at distances of more than 100 meters, or even 200 meters, from the emission device according to the invention. As a comparison, this distance is less than a meter with the silicon technology.

Such detection distances can be particularly useful, particularly in the automobile field.

In the following, we will demonstrate that the reduced distance between two neighbouring extraction elements is such that beam replication phenomena are limited, even in the particular configuration of the invention.

In an emission device according to the invention, all extraction elements of a particular straight segment emit with the same optical phase.

$\theta_m$ and $\psi_m$ denote the angles defining the orientation in space of the principal emission direction (m=1) and of any beam replications (m>1).

The orientation of the principal emission direction, and any beam replications, is defined by:

$$\sqrt{\sin^2(\theta_m) + \sin^2(\psi_m)} = \frac{\Delta\varphi + m*2\pi}{k_0 * P} \quad (5)$$

in which $\Delta\varphi$ is the phase shift between two neighbouring straight segments, P is the characteristic distance between two extraction elements of two neighbouring straight segments, and m is an integer such that:

$$\sin^2(\theta_m) + \sin^2(\psi_m) \leq 1 \quad (6)$$

Therefore the two angles $\theta_m$ and $\psi_m$ are not independent of each other (same variable m). However, they are related by:

$$\tan(\alpha) = -\frac{\sin(\psi_m)}{\sin(\theta_m)} \quad (7)$$

Therefore, by varying the values of $\alpha$ (through the choice of passing or blocking state for each optical coupler 260), and $\Delta\varphi$ (through phase shift elements 250), all possible values of $\theta_m$ and $\psi_m$ can be accessed.

According to equations (5) and (6), non-beam replication is achieved for small values of P, which is possible because the phase shift elements 250 are offset from straight segments that contain the extraction elements.

We then illustrate results obtained by digital simulations using an analytic model based on Green's functions.

This model is based on the assumption according to which the elementary sources that are extraction elements are dipolar sources, the orientation of the dipole being the orientation of the electric field in the corresponding emission waveguide.

The electric field radiated by an elementary source is defined as a combination of the electric field radiated by a dipole oriented along (OX), and the electric field radiated by a dipole oriented along (OY).

By summating the electric fields from the different elementary sources, the result obtained is the electrical intensity (modulus of the total electrical field squared) in a far observation plane (in this case $1000*\lambda_p$), that describes all angles $\theta$ and $\psi$ so that the extraction diagram can be displayed.

FIGS. 4A to 4D illustrate a simulation of the selection of a first extraction plane using an emission device according to the invention, and scanning of the principal emission direction in said extraction plane.

Figure 4A:
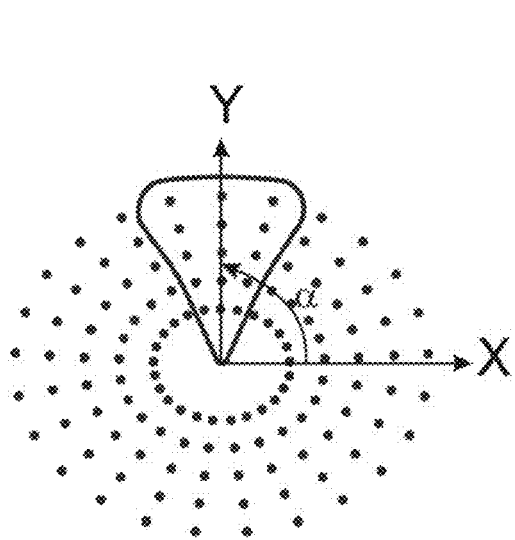
FIGS. 4A to 4D illustrate scanning of the principal emission direction in a first extraction plane, using an emission device according to the invention.

FIG. 4A diagrammatically illustrates a top view of the extraction elements of an emission device of the type show in FIG. 2, comprising 25 TE polarised emission waveguides (electrical field perpendicular to the guides).

The emission wavelength is equal to $\lambda_p = 1.55$ μm.

The emission waveguides are made of silicon.

The distribution pitch of the extraction elements on an emission waveguide is equal to 3 μm.

The centre-to-centre distance between extraction elements of two neighbouring straight segments is equal to about 3 μm.

The surrounded extraction elements correspond to activated emission waveguides, in this case there are three of them.

The average direction of straight segments of activated waveguides is equal to $\alpha = 90°$.

Figure 4B:
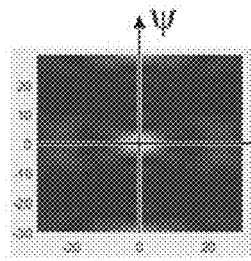
Figure 4C:
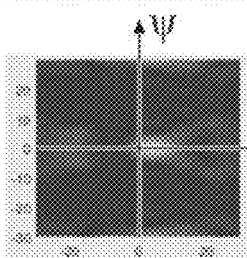
Figure 4D:
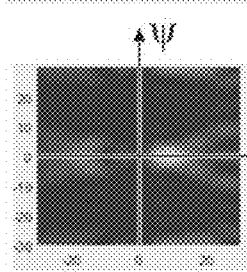

FIGS. 4B to 4D illustrate the distribution of electrical power in far field for different values of the phase shift introduced by phase shift elements of activated waveguides.

These different phase shift elements correspond to a phase shift $\Delta\varphi$ between beams circulating on straight segments of two directly neighbouring activated waveguides.

The abscissa axis and the ordinate axis correspond to angles $\theta$ and $\psi$ defined above respectively.

A light point corresponding to the principal emission direction can be seen on each of these figures.

In FIG. 4B, the phase shift $\Delta\varphi$ is null (the optical phases associated with the three activated waveguides are equal to $\varphi=0°$; $\varphi=0°$; $\varphi=0°$ respectively). The light point is positioned at ($\theta=0°$; $\psi=0°$).

In FIG. 4C, the phase shift $\Delta\psi$ is 60° (the optical phases associated with the three activated waveguides are equal to $\varphi=-60°$; $\varphi=0°$; $\varphi=+60°$ respectively). The light point is positioned at ($\theta=8°$; $\psi=0°$).

In FIG. 4D, the phase shift Δφ is 120° (the optical phases associated with the three activated waveguides are equal to φ=−120°; φ=0°; φ=+120° respectively). The light point is positioned at (θ=8°; ψ=0°).

An extraction plane defined by ψ=0°, parallel to the (OXZ) plane, can be clearly seen.

The adjustment of phase shifts can be used for scanning in this plane.

FIGS. 5A to 5D illustrate a simulation of the selection of a second extraction plane using an emission device according to the invention, and scanning of the principal emission direction in this extraction plane.

Figure 5A:
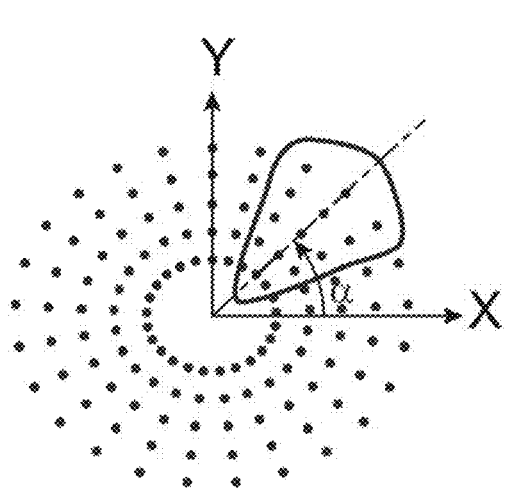
FIGS. 5A to 5D illustrate scanning of the principal emission direction in a second extraction plane, using an emission device according to the invention.

The only difference between figure 5A and FIG. 4A is that the angle α in figure 5A is equal to 45°.

Figure 5B:
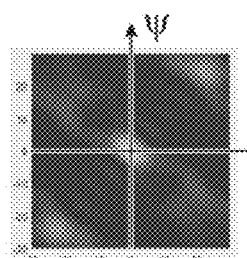
Figure 5C:
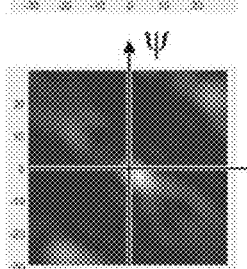
Figure 5D:
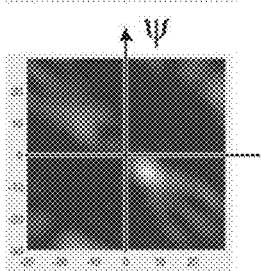

FIGS. 5B to 5D correspond to the same three phases of the activated waveguides as FIGS. 4B to 4D.

An extraction plane defined by θ=−ψ can be clearly seen. The adjustment of phase shifts can be used for scanning in this plane.

It can be seen that the emission device illustrated in FIG. 2 has some redundancy, due to its central symmetry. Each orientation of the extraction plane can be obtained in two different ways, using a first or a second series of activated waveguides, symmetric with each other.

FIG. 6 diagrammatically illustrates a top view of a second embodiment of a device 600 according to the invention;

The only difference between this second embodiment and the first embodiment is that the straight segments 623 are distributed over 180° instead of 360°.

The number of straight segments 623 is divided by two. Therefore the same applies for the number of optical couplers 660 and the number of phase shift elements.

For the reasons mentioned above, this does not reduce the number of possible orientations for the extraction plane.

The injection waveguide 610 has an input region 611 and an injection region 612, that extends along a semi-circle, following the shape of a half-ring.

This second embodiment has the advantage that it provides a very small footprint.

FIG. 7 diagrammatically illustrates a top view of a third embodiment of a device 700 according to the invention.

Only the differences between this embodiment and the embodiment shown in FIG. 6 will be described.

In this case, the straight segments of the emission waveguides 720 are not oriented along the radii of the same circle.

Some neighbouring straight segments are parallel to each other, while other neighbouring straight segments are inclined to each other by an angle β.

The different straight segments are all oriented towards the same core zone 740, that for each straight segment is located on the side opposite the associated optical coupler.

This embodiment can give priority to some extraction planes.

FIG. 8 diagrammatically illustrates a perspective view of a fourth embodiment of a device 800 according to the invention;

FIG. 8 simply represents the orientation axes 824 of the straight segments of the different emission waveguides.

According to this embodiment, not all the emission waveguides are located in the same plane parallel to (OXY). In particular, not all the lower faces of the different emission waveguides are located in the same plane parallel to (OXY).

At least two emission waveguides have lower faces located in two different planes, both parallel to (OXY). The emission device is said to be a multi-level device.

In this case, the different straight segments are oriented along the radii of the same cylinder of revolution, rather than along the radii of the same circle. In other words, they are oriented along the radii of different circles corresponding to orthogonal sections, at different heights of the same cylinder of revolution.

The extraction elements can then be distributed along lateral faces of concentric cylinders of revolution.

This embodiment makes it possible to place neighbouring phase shift elements in separate planes parallel to (OXY), so that the layout of the phase shift elements can be made even denser, and therefore the straight segments and optical power extraction elements can also be made denser. Beam replication is thus further limited.

According to one advantageous embodiment, the emission waveguides and more particularly their lower faces, are distributed alternatively in a first and a second plane parallel to (OXY). The phase shift elements are distributed in a similar manner, alternatively in this first and this second plane. In this case, the injection waveguide can extend at the level of either this first or this second plane. It thus makes evanescent coupling through the side in either this first or this second plane, and through the bottom or the top in the other among the first and the second plane.

The invention is not limited to the examples detailed above, and many variants can be used without going outside the framework of the invention.

For example, a distribution pitch of the extraction elements is not necessarily identical on all straight segments.

Furthermore, the straight segments do not necessarily all have the same number of extraction elements.

Each straight segment may even comprise only one extraction element. The different extraction elements are then preferably arranged along the same circle. The emission diagram in far field then has a light line, not a light point.

The extraction elements of the different straight segments can be arranged along different patterns, in which each pattern receives a single extraction element from each straight segment, and in which the patterns are all homothetic with a same arbitrary base shape, with different magnification ratios.

One example of an optical coupler with an adjustable coupling ratio is a heating coupling ring. However, the invention is not limited to this example. For example, the optical coupler may be composed of a coupling ring made of a doped material in which the coupling ratio is adjusted by injection or desertion of carriers. As a variant, each optical coupler with an adjustable coupling ratio can include a resonant waveguide segment with Bragg mirrors, a resonator with photonic crystals, microdisks. As mentioned above, each optical coupler according to the invention may be composed of a simple optical switch. Any switch with one input channel and two output channels can then be used, for example a multimode interferometer, a Mach-Zehnder Interferometer, etc.

The invention may also relate to a complete system for emission of an electromagnetic wave front, comprising the emission device according to the invention, each optical coupler comprising a coupling ring and each phase shift element comprising a segment of the corresponding emission waveguide, called the phase shift segment, the system also comprising:
- a device for controlling the intensities of a series of electrical voltages or currents providing heating by the Joule effect to each coupling ring, and
- a device for controlling the intensities of a series of electrical voltages or currents providing heating by the Joule effect to each phase shift segment associated with an optical coupler for which the coupling ratio is higher than a predetermined threshold.

The invention claimed is:

1. A device for emission of an electromagnetic wave front designed to be connected in use to a light source emitting a light beam, and comprising:
   at least three emission waveguides, each comprising a straight segment that comprises one or several optical power extraction elements, each of the optical power extraction elements being composed of a diffracting structure or a diffusing structure;
   on a side of an input of each of said straight segments that is disposed upstream from each of said straight segments, a corresponding phase shift element; and
   on a side of an input of each of said phase shift elements that is disposed upstream from each of said phase shift elements, a corresponding optical coupler, each optical coupler having an adjustable coupling ratio,
   wherein at least two of said straight segments extend along straight lines that are not parallel to each other.

2. The device according to claim 1, further comprising an injection waveguide along which said optical couplers are distributed, each of said optical couplers being located between the injection waveguide and one of the phase shift elements.

3. The device according to claim 1, wherein each straight segment comprises a plurality of extraction segments, distributed at a regular pitch along said straight segment.

4. The device according to claim 3, wherein said regular pitch is the same on each straight segment.

5. The device according to claim 1, wherein each straight segment comprises a plurality of extraction elements having different extraction ratios, arranged along each segment by increasing order of extraction ratio from an input end of said each segment, on a same side as a corresponding phase shift element.

6. The device according to claim 1,
   wherein each straight segment comprises a plurality of extraction elements,
   wherein the extraction elements are distributed along a series of patterns,
   wherein different patterns are homothetic with each other, and
   wherein to each pattern corresponds an extraction element of each of said segments.

7. The device according to claim 1,
   wherein each straight segment comprises a plurality of extraction elements, each of said extraction elements is an extraction network, and
   wherein extraction networks in a same straight segment are oriented along a same direction and have a same period.

8. The device according to claim 1, wherein said straight segments are all oriented towards a same core zone, which for each straight segment is located on a side opposite a corresponding phase shift element.

9. The device according to claim 8, wherein said straight segments are oriented along radii of a same circle or a same cylinder.

10. The device according to claim 9, wherein said straight segments are arranged at a regular angular pitch.

11. The device according to claim 10, wherein said straight segments are distributed over an angular range of 360°.

12. The device according to claim 10, wherein said straight segments are distributed over an angular range of between 160° and 200°.

13. The device according to claim 9,
    wherein optical power extraction elements of different straight segments are distributed along a series of concentric circles or concentric cylinders, and
    wherein to each circle or cylinder corresponds an optical power extraction element of each of said segments.

14. The device according to claim 1, wherein the emission waveguides comprise silicon nitride.

15. A method of using an emission device according to claim 1, wherein each optical coupler comprises a coupling ring and each phase shift element comprises a phase shift segment of an emission waveguide, the method comprising:
    adjusting a respective coupling ratio of said each optical coupler by adjusting an intensity of an electric voltage or current supplying heating by the Joule effect to a corresponding coupling ring; and
    adjusting a corresponding phase shift introduced by each of the phase shift elements associated with said each optical coupler, of which a coupling ratio exceeds a predetermined threshold, by adjusting an intensity of an electric voltage or current supplying heating by the Joule effect to a corresponding phase shift segment.

* * * * *